2,995,383
RUBBER VEHICLE SUSPENSION
Stephen Barker, Temple City, Calif., assignor to Utility Trailer Manufacturing Company, Industry, Calif., a corporation of California
Filed Apr. 23, 1959, Ser. No. 808,489
9 Claims. (Cl. 280—124)

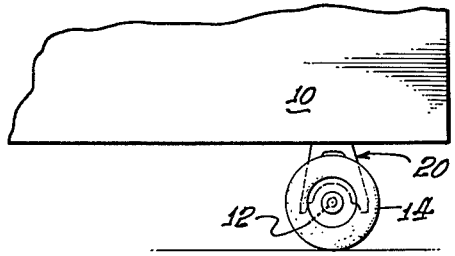
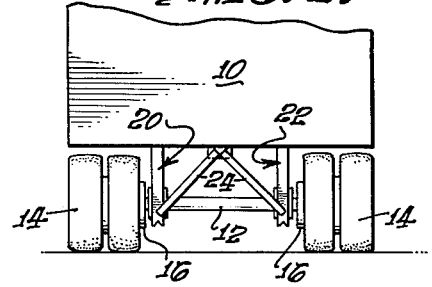
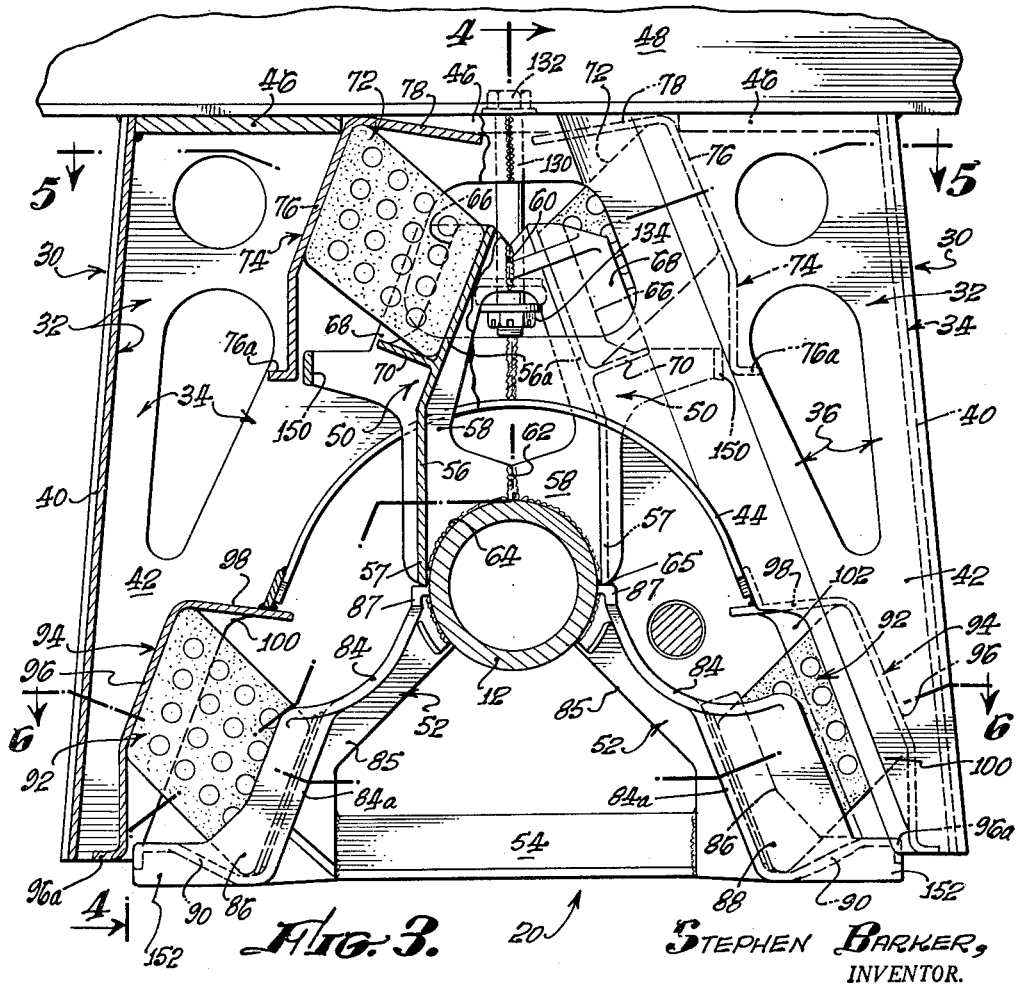

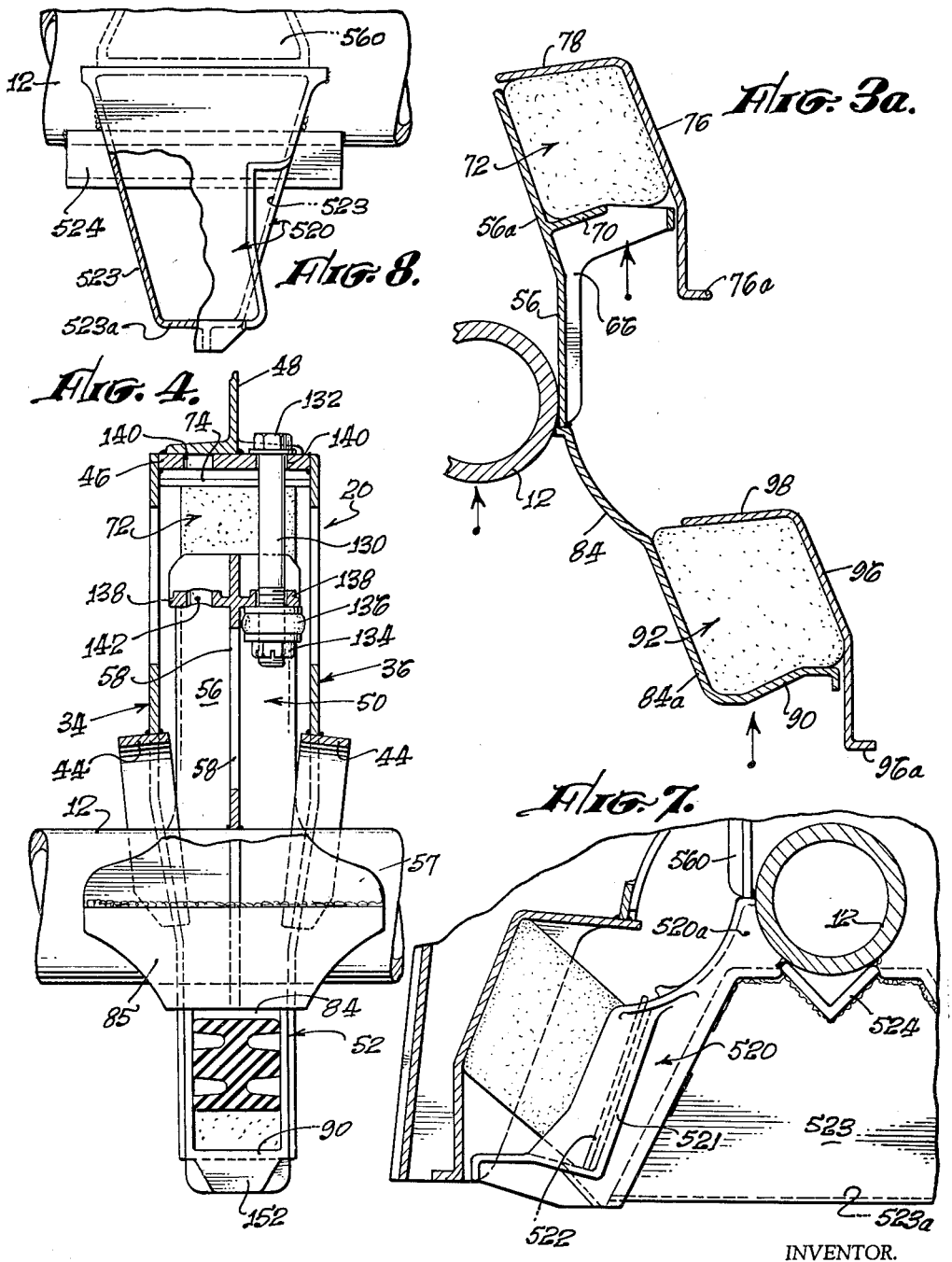

This invention has to do with certain improvements in the type of rubber suspensions for vehicles and the like shown in the previous copending application, filed by Percival M. Heinmiller and Irving Karsh, Ser. No. 724,967, filed March 31, 1958.

That type of suspension involves two V-formations located on a common V-axis with their arms spacedly opposed and with blocks of rubber or similar material between the opposed arms. The load is taken by rubber distortion caused by movement of one V-formation relative to the other generally along the line of the common axis. In the device of said application, side sway, rebound and axle torque due to brake application are also controlled.

The improvements of the present invention have to do with such things as forming the outer V-formation in the form of an enclosing housing, controlling side sway and providing positive limits for relative lateral movements and for relative rotative movement due to axle torque. The invention also features general improvement in design to produce a strong suspension of light weight; and one composed largely of duplicate parts, and simple to manufacture.

Other features of improvement in the present invention will appear from the following description of preferred designs illustrative of the invention, with reference to the accompanying drawings, in which:

FIG. 1 is a schematic side elevation showing the V-suspension applied to the rear axle of a vehicle;

FIG. 2 is a schematic view of the same from the rear;

FIG. 3 is an enlarged elevation, with parts in broken-away section, of one V-suspension unit in the same aspect as in FIG. 1;

Figure 5:
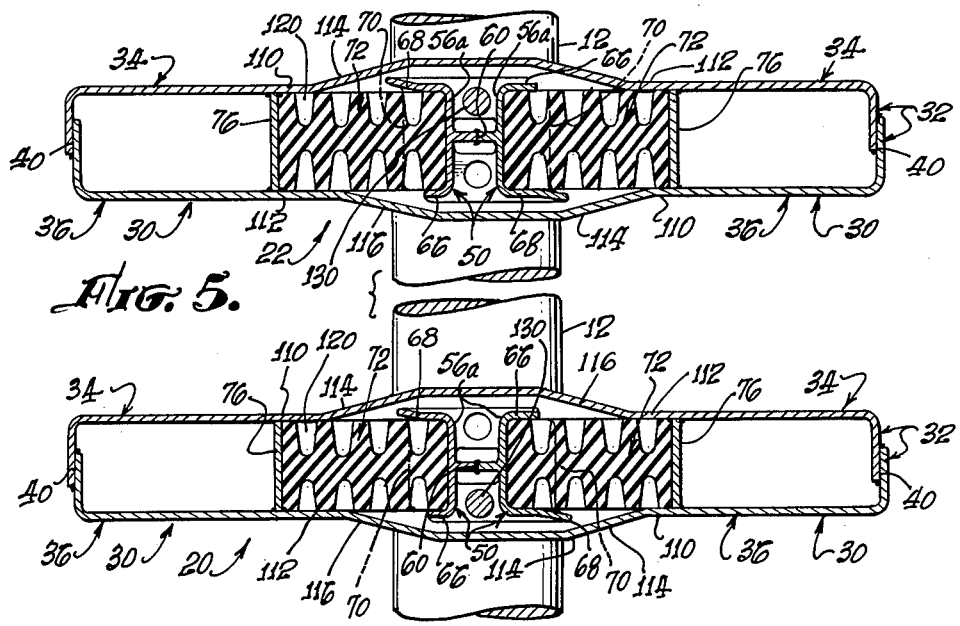
Figure 6:
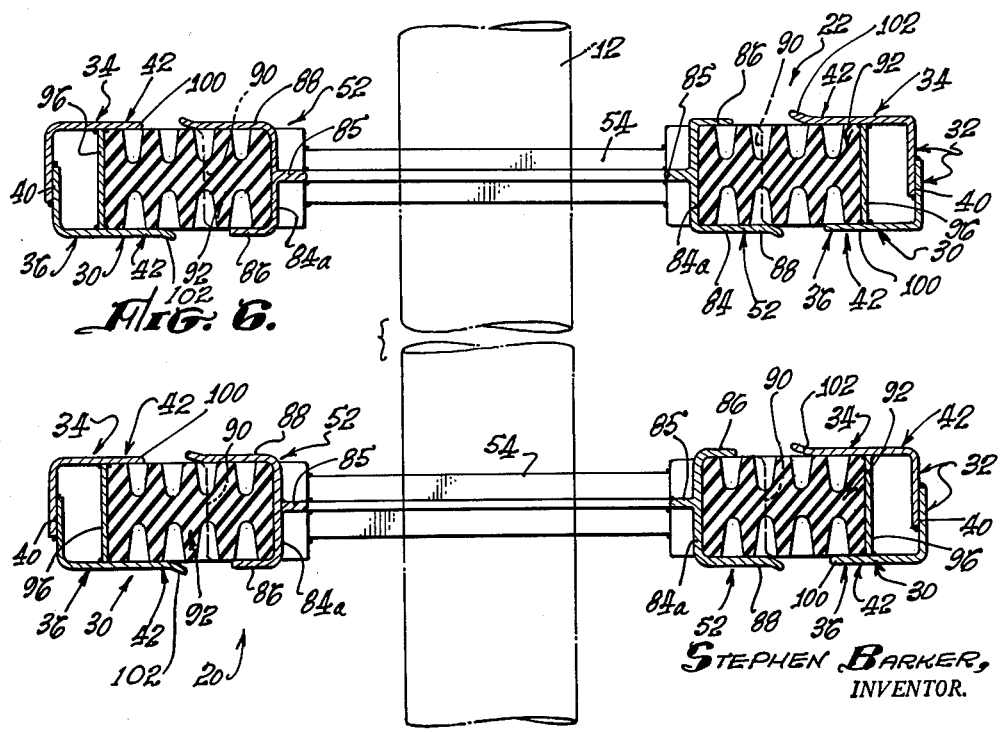

FIG. 3a schematically shows part of the unit of FIG. 3 in full load compression;

FIG. 4 is a vertical section taken as indicated by line 4—4 on FIG. 3;

FIGS. 5 and 6 are horizontal sections through both units on lines 5—5 and 6—6, respectively, in FIG. 3; and FIGS. 7 and 8 are side and end elevations showing a modification.

In FIGS. 1 and 2 a vehicle 10 is shown with rear axle 12 on which wheels 14 are mounted for rotation, with braking means, indicated at 16, through which wheel torque is transmitted to dead axle 12. The vehicle is shown as supported from the axle by two V-units 20 and 22. In each of these units the outer V-formation is mounted on the vehicle body, as will appear; and those outer formations may be laterally braced to the body by such bracing means as is indicated at 24 in FIG. 2.

I refer now more particularly to FIGS. 3 and 4 which show details of the unit 20; and also to FIGS. 5 and 6 which show further details of both units 20 and 22. As will appear, unit 22 is a duplicate of unit 20.

The frame of the outer V-formation 30 shown in these figures is constructed in the form of an enveloping housing 32 formed of two duplicate halves 34 and 36. The duplicate housing halves, best shown in FIGS. 3, 5 and 6, are formed of heavy sheet or plate metal and are joined at their overlapping outer peripheral edges as is best seen in FIGS. 5 and 6. As will be seen by inspection of those figures the edge overlaps at 40 are so related that the housing halves 34 and 36 are duplicates so that they may be fabricated with one mold or set of dies.

Each housing half has an upper body portion (the part which is generally above the flanged lower-edge arc shown at 44 in FIGS. 3 and 4) and two downwardly and divergently extending leg portions 42. The inner upper edges of these leg halves terminate and merge in the arc formation which is shown as flanged externally and internally at 44. The overlaps 40 of the outer edges of the housing halves are welded together as indicated; and as shown in FIGS. 3, 5 and 6, that welded overlap extends down the full lengths of the legs. In plan and horizontal section the general shape of the housing is elongate rectangular. The housing, with its depending legs, is secured to the vehicle frame. That is preferably done through the medium of a heavy top plate 46 welded into the otherwise open upper end of the housing (see FIG. 4). The whole housing, together with the parts that it carries in its interior, may then be secured as a unit to vehicle frame 48 by any suitable means, such as bolting or by welding. The top plate 46 may preferably only comprise the central part shown in FIGS. 3 and 4.

The inner V-formation of the V-assembly is made up preferably of upper and lower pairs of duplicate parts, with suitable bracing between the lower pair, and attached to the axle 12. The parts 50 of the upper pair are attached to the axle in opposing relation and abut each other at welded joints 60 and 62, as is best shown in FIG. 3. The parts 52 of the lower pair are attached to the axle and have their lower diverging ends, below the axle, braced apart by a weld-connected strut 54. The upper portions of parts 50 extend up inside the housing body above the flanged arc at 44.

Each part 50 of the upper pair has a web 56, extending generally vertically and having an upper portion 56a which extends upwardly and inwardly toward the central vertical axis of the V-formation at an angle preferably of about 20° to the vertical. On their sides which are toward each other the webs have vertically extending flanges 58 which mutually abut at 60 at their upper ends and at 62 at their lower ends. They are welded together at their abutments, and are both welded at 64 and 65, to axle 12 at their lower ends. The pair of parts thus forms a single rigid unit attached to the axle.

Protruding from the edges of the outer faces of webs 56a there are laterally spaced flanges 66 and 68 (see particularly FIG. 5), and a laterally extending seat 70. Webs 56a and seats 70 form seats for the inner faces and lower ends of the rhomboidal rubber blocks 72, whose outer faces and upper ends are seated on the webs and seats of cross members 74 which are welded in place across the interior of the external housing 32.

As shown in FIGS. 3 and 5, seat members 74 have seat webs 76 extending upwardly and inwardly in parallel opposition to seat webs 56a of the inner V-formation, to form seats for the block faces opposite 56a, and at their upper ends have generally horizontally flanges 78 that form the seats for the upper ends of the blocks 72. The side flanges for seats 76 are formed in the housing structure, as will be described.

The lower pair of duplicate members 52, of the inner V-formation have webs 84 with portions 84a sloping at the same angle as upper web-seats 56a and having lateral flanges 86 and 88 (see FIG. 6), and lower seat flanges 90, forming seats for one face and the lower end of each of the lower rubber blocks 92.

Opposing those seats, seat members 94 are welded across the interiors of the housing legs 42. These seat members have webs with portions 96 in parallel spaced opposition to web seats 84a, and upper flanges 98, forming seats for the outer faces and upper ends of blocks 92. Side flanges 100 and 102 are formed by the side housing portions of the legs 42 as shown in FIG. 6.

The webs 84 of the lower duplicate members 52 have reinforcing flanges 85, and those flanges and the webs 84 are welded at their upper ends to the axle. Webs 84 are widened at their upper ends as shown at 87 in FIG. 4. Those widened upper ends abut the similarly widened lower ends 57 of the upper member webs 56; and the abutting widened portions are welded both to the axle and to each other.

The arrangements and formation of the several side flanges for the block seats is best shown in FIGS. 5 and 6, which show, respectively, the arrangement for the upper and the lower blocks.

In FIG. 5 it will be seen that the seats 56a of the upper members 50 of the inner V-formation have relatively narrow side flanges 66 and relatively deep side flanges 68. The relative arrangement of these flanges, as seen in FIG. 5, is such that the two members 50 are duplicates; the one on the right in that figure being the same as the one on the left simply swung around through 180°. The opposing seat 76 of the outer V-formation has its relatively narrow and deep flanges 110 and 112 formed by the housing halves 34 and 36. As seen in FIG. 5 the effective outer edges of flanges 110 and 112 are formed by lateral expansions of the housing halves at 114 and 116. The relative arrangement of the flanges 110 and 112 is such that narrow flanges 110 lie on the side of rubber blocks 72 opposite the sides at which lie the narrow flanges 66 of the inner V-formation. Consonantly, the deeper flanges 112 of the outer V-formation lie in the same opposed relations to the deeper flanges 68 of the inner V-formation. Thus, housing half 34 is also in this regard a duplicate of housing half 36, again merely swung around through 180°.

Without further explanation in detail, it will be seen immediately from FIG. 6 that the arrangements of the lower narrow and deep flanges, 86 and 88 on the inner V-formation, and 100, 102 of the outer V-formation, is the same as that for the upper flanges; again making the two members 52 of the inner V-assembly, to be duplicates, and making the leg portions of the housing halves again to be duplicates.

The lateral arrangements of the narrow and wide flanges control side shift and side sway of the supported vehicle. If side shift of the body and outer V-formation to the right (up in FIGS. 5 and 6) takes place, the opposing sets of deep flanges 112, 68 and 102, 88, at the left of the axle axis in those figures, put rubber blocks 72 and 92 very largely in compression. On shift or sway of the body and outer V-formation to the left (down in those figures) the opposing sets of deep flanges to the right of the axle axis come into play in the same manner.

Positive limitation of abnormal relative side shift as between the body and the axle and its carried V-formation unit is limited by the amount that the upper part of that unit can shift inside the upper body of the housing. As will be seen in FIGS. 4 and 5 the flanges 68 are normally spaced from the body walls by a certain distance; and (FIG. 4) the webs 56 are also spaced from housing flanges 44. Contact at either or both those points positively limits the relative side shift.

The load is carried by the rubber blocks, by their distortion in compression and shear between such a condition of no load or light load shown in FIG. 3, to a condition of substantial full load as shown schematically in FIG. 3a. The blocks are not cemented or otherwise attached to their seats, being free to creep. The action in regard to block compression and shear, and rebound control, and other features of the block actions, is the same as in the prior co-pending application, reference to which is had for explanation of those actions.

The blocks here are shown with spaced recessings 120. Depending on the total amount of such recessing, or its lack, the blocks accommodate lighter or heavier loads; lesser recessing accommodating heavier loads. The structure of the V-suspension here described can thus be manufactured and applied in one standard size for greatly different loads.

To positively limit the upward movement of the outer V-formation relative to the inner one, a limiting bolt 130 is shown with its head 132 above the outer housing plate 46 and its lower nut 134, with a compression washer 136, under a lug 138 that is formed on the upper members 50 of the inner V-formation at or near their point of juncture at 60. If desired, housing plate 46 may have holes 140 for the bolt at opposite sides of the plate center; and lug 138 may have a similarly located pair of bolt holes 142. This makes it feasible to have the two suspension units 20 and 22 related to each other, if desired, by relative swinging through 180° in a horizontal plane, with the limiting bolt 130 always in an accessible location preferably at the inside face of the vehicle frame 48. To detach the axle and the inner V-formation from the outer V-formation and from the vehicle, it is only necessary to release the bolts 130.

When torque is applied by the brakes from wheels 14 to the dead axle 12 and thus to the inner V-formation, tending to rotate that formation relative to the outer one, that relative rotation is opposed by distortion of one or the other pair of upper and lower blocks 72 and 92. As shown here the several blocks are of substantially the same dimensions, and their facial areas in contact with the inner V-assembly are at substantially equal and opposite radii from the axis of axle 12. The resistance to torque applied to the axle is consequently centered on that axis and results in no appreciable movement of the axle transversely of itself. This arrangement of substantially equal block areas and sizes, and substantially equal radial dispositions, is one specific arrangement within the general definition set out in said prior application; that is, that the facial distortion areas of the blocks of a pair are in substantially inverse relation to their radial distances from the axle.

Torque rotation of the axle, opposed as just stated, is positively limited by the arrangement now illustratively described.

Upper members 50 of the inner V-formation carry extensions 150, adapted, upon a pre-determined rotational movement about the axle center, to contact the lower ends of one or the other of webs 76 of the outer V-formation, the lower ends of those webs being reinforced with flanges 76a to withstand impact. Similarly, the lower ends of members 52 of the inner V-formation, at the seat flanges 90, are provided with toes 152 adapted to contact one or the other of the lower ends of webs 96 of the outer V-formation, on the same rotational movement about the axle center that causes limiting contact at 150, 76. The lower ends of 96 are also reinforced with flanges 96a. With torque rotation being normally resisted as explained, by the rubber blocks at opposite sides of the axle, and abnormal torque rotation limited by the limiting stops at opposite sides of the axle, no appreciable movement of the axle transverse of itself takes place.

FIGS. 7 and 8 show another and preferred form and mounting for the lower members 52 of the inner V-formation. As shown there, these members 520 are found in the general configuration shown in these views, with seats 521 and seat plates 522. Members 520 are mutually backed up by a plate formation 523 extending between and welded to them. As viewed in the aspect of FIG. 8 this plate structure 523 embodies two plates joined together at their bottoms at 523a and arranged in V-formation in that aspect. An angle 524 is welded to the underside of the axle, and the upper ends 520a of members 520 and also the upper edges of 523 abut and are welded to angle 524. Upper ends 520a also abut and are welded to the axle and to the lower ends of upper members 560.

I claim:

1. A suspension assembly for use in a vehicle having a front end, a rear end, a transverse axle and a sprung mass: comprising in combination an enclosing housing attached to the sprung mass and extending downwardly therefrom, said housing having an upper body portion above the axle and downwardly extending leg portions located forwardly and rearwardly of the axle, both said body and leg portions having laterally opposite walls, said body portion being open at its lower end above the axle and said leg portions being open at their sides toward each other and toward the axle, seat members extending across the interiors of the body portion and leg portions and secured to their laterally opposite walls with seat surfaces forward and rearward of the axle inclining upwardly and toward the vertical plane of the axle, an axle mounted unit having seat surfaces spacedly opposing the first mentioned seat surfaces in pairs, said axle mounted unit including two parts extending below the axle forwardly and rearwardly thereof, and thrust means extending between said parts below the axle, said thrust means comprising a pair of laterally spaced plates secured to said parts and to the axle.

2. The combination defined in claim 1 and also including an angle iron secured to the under side of the axle and to which said spaced plates are secured.

3. A suspension assembly for use in a vehicle having a front end, a rear end, a transverse wheel supported element and a sprung mass: comprising in combination an enclosing housing attached to the sprung mass and extending downwardly therefrom, said housing having an upper body portion above said element and downwardly extending leg portions located forwardly and rearwardly of said element, both said body and leg portions having laterally opposite walls, said housing being composed of two duplicate lateral parts joined together along a vertical longitudinal plane central of the housing, said body portion being open at its lower end above said element and said leg portions being open at their sides toward each other and toward said element, seat members extending across the interiors of the body portion and leg portions and secured to their laterally opposite walls with seat surfaces forward and rearward of said element inclining upwardly and toward the vertical plane of said element, an element mounted unit having seat surfaces spacedly opposing the first mentioned seat surfaces in pairs, said element mounted unit having an upper portion within the body portion of the housing, and blocks of rubber-like material seated on and extending between said pairs of opposing seat surfaces.

4. The combination defined in claim 3 and in which the element mounted unit is composed of two duplicate parts located forwardly and rearwardly of said element and joined together and to said element.

5. A suspension assembly for use in a vehicle having a front end, a rear end, a transverse axle and a sprung mass: comprising in combination an enclosing housing attached to the sprung mass and extending downwardly therefrom, said housing having an upper body portion above the axle and downwardly extending leg portions located forwardly and rearwardly of the axle, both said body and leg portions having laterally opposite walls, said body portion being open at its lower end above the axle and said leg portions being open at their sides toward each other and toward the axle, seat members extending across the interiors of the body portion and leg portions and secured to their laterally opposite walls with seat surfaces forward and rearward of the axle inclining upwardly and toward the vertical plane of the axle, an axle mounted unit having seat surfaces spacedly opposing the first mentioned seat surfaces in pairs, said axle mounted unit having an upper portion within the body portion of the housing, blocks of rubber-like material seated on and extending between said pairs of opposing seat surfaces, the spacedly opposing pairs of seat surfaces being arranged above and below the axle, at approximately equal radial distances therefrom, and the pressure areas of the rubber-like blocks on said seat surfaces being approximately equal, and pairs of interengaging stops carried by the housing and by said axle mounted unit in positions at opposite sides of the axle and adapted to simultaneously engage at said opposite sides upon a predetermined rotational movement of the axle mounted unit about the axis of the axle, and the pairs of limiting stops being provided by extensions of the seat members carried by the housing and opposing stop members carried by the axle mounted unit.

6. A suspension assembly for use in a vehicle having a front end, a rear end, a transverse wheel supported element and a sprung mass: comprising in combination an enclosing housing attached to the sprung mass and extending downwardly therefrom, said housing having an upper body portion above said element and downwardly extending leg portions located forwardly and rearwardly of said element, both said body and leg portions having laterally opposite walls, and having forward and rear walls extending laterally between the laterally opposite walls, said body portion being open at its lower end above said element and said leg portions being open at their sides toward each other and toward said element, seat members extending across the interiors of the body portion and leg portions and secured to their laterally opposite walls with seat surfaces forward and rearward of said element inclining upwardly and toward the vertical plane of said element, said seat members being respectively spaced, in the body and leg portions, rearwardly and forwardly of the forward and rear body and leg walls, an element mounted unit having seat surfaces spacedly opposing the first mentioned seat surfaces in pairs, said element mounted unit having an upper portion within the body portion of the housing, and blocks of rubber-like material seated on and extending between said pairs of opposing seat surfaces.

7. The combination defined in claim 6, and wherein said pairs of opposing seat surfaces are provided with lateral flanges which exert lateral pressures on said blocks upon lateral movement of the element mounted unit, and wherein the upper part of the element mounted unit is laterally spaced within the opposing lateral walls of the housing body, lateral contact of said element mounted unit with said housing walls limiting relative lateral movement of said unit.

8. The combination defined in claim 6 and in which the upper portion of the element mounted unit lies between the laterally opposite walls of the upper body portion of the housing, said laterally opposite walls limiting the lateral movements of the element mounted unit relative to the housing and its seat members.

9. The combination defined in claim 6 and in which the laterally opposite walls of the housing form lateral flanges projecting toward the element mounted unit from the lateral edges of the first mentioned seat members, and including lateral flanges projecting from the lateral edges of the second mentioned seat surfaces toward the first mentioned seat members, the several lateral flanges confining the rubber-like blocks laterally on the seats.

References Cited in the file of this patent

UNITED STATES PATENTS

| | | |
|---|---|---|
| 2,233,540 | Latshaw | Mar. 4, 1941 |
| 2,758,832 | Hickman | Aug. 14, 1956 |
| 2,933,329 | Heinmiller | Apr. 19, 1960 |

FOREIGN PATENTS

| | | |
|---|---|---|
| 909,533 | Germany | Apr. 22, 1954 |